United States Patent
Cowden et al.

(10) Patent No.: US 6,834,099 B1
(45) Date of Patent: Dec. 21, 2004

(54) END-USER COMMUNICATIONS TEST SYSTEM

(75) Inventors: Craig Thomas Cowden, Leesburg, VA (US); Neil Richard Harrington, Ashburn, VA (US); David Patrick Hassett, Leesburg, VA (US); William Thomas Winkert, Jr., Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 93 days.

(21) Appl. No.: 10/247,091

(22) Filed: Sep. 19, 2002

(51) Int. Cl.$^7$ .......................... H04M 1/24; H04M 3/08; H04M 3/22
(52) U.S. Cl. .................. 379/29.01; 379/14.01; 379/10.02; 379/16
(58) Field of Search ................. 379/1.01, 9, 14–14.01, 379/10.02, 10.03, 15.01, 16–18, 22.01, 22.02, 22.03, 29.01, 29.06

(56) References Cited

U.S. PATENT DOCUMENTS

| | | | |
|---|---|---|---|
| 5,479,473 A | * 12/1995 | Zey | 379/18 |
| 5,937,033 A | * 8/1999 | Bellows | 379/29.01 |
| 5,940,472 A | * 8/1999 | Newman et al. | 379/10.02 |
| 5,974,115 A | * 10/1999 | Chan et al. | 379/27.01 |
| 6,002,746 A | * 12/1999 | Mulcahy et al. | 379/22 |
| 6,091,713 A | * 7/2000 | Lechleider et al. | 370/248 |
| 6,349,130 B1 | * 2/2002 | Posthuma et al. | 379/1.04 |
| 6,493,425 B1 | * 12/2002 | Abe | 379/1.01 |

* cited by examiner

Primary Examiner—Duc Nguyen

(57) ABSTRACT

The invention is a method and system for remotely testing network paths diagnosing problems in establishing a communications link between a call-routing component and a target component in a telecommunications network environment. The test system permits a call to be originated at any end office from a remote location. Originating a call at a customer's end office accurately recreates the customer's experience. A test method accurately reveals problems with a specific communications path. The last mile of a customer's connection can also be tested.

38 Claims, 6 Drawing Sheets

END-USER COMMUNICATIONS TEST SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The invention is related to the field of communications test systems and, in particular, to an end-user dial tester that enables remote testing and diagnosing of problems in establishing connections in a telecommunications network environment.

BACKGROUND OF THE INVENTION

A popular method of connecting to the Internet is by way of "dial-up" service through modems. The Internet is a network of networks used to access, retrieve, process, and store all manner of information around the world. Dial-up service generally refers to Internet access provided to a customer who dials a prescribed phone from a personal computer (PC). The phone number is dialed by the customer's modem and is configured to travel across various network paths to another modem, which provides access to the Internet. These various network paths passing through various network components must be tested in order to offer quality dial-up service.

Dial-up service requires accessing one or more networks, such as the Public Switched Telephone Network (PSTN). The PSTN is generally the local, long-distance and international phone system used everyday. Although other hardware and software components are involved, a user's dial-up connection is established via a primary path that includes passing through a local exchange carrier (LEC) end office (EO), a target switch, and a remote access server (RAS) such as a modem bank. Switches are conventional devices used to complete or break electrical paths or select circuits. A secondary path through a local access tandem switch is often provided to handle calls when the primary path is unavailable. A long-distance dialer's call passes through a remote access tandem switch and the local access switch to reach the target switch.

Customers usually dial local numbers to access the Internet to avoid incurring long-distance fees. Thus, most customer calls are routed through an EO. The path through the EO to the target switch and modem bank may not be available at all times because of various problems on the network.

Diagnosing, solving and preventing various problems with establishing calls over this primary path is necessary to maintain a high quality of service. Various transactions must be facilitated correctly to establish a quality connection. For example, local exchange carrier translations must be verified and routed properly. A translation is the changing of information from one form to another or the interpretation by a switching system of all or part of a destination code to determine the routing of a call. Verifying translations includes verifying that the primary route described above is operating at a prescribed utilization before overflowing onto the secondary route. For instance, an incumbent local exchange carrier (ILEC) may wrongfully translate all competing local exchange carrier (CLEC) CLEC traffic to the secondary (local tandem) route. An ILEC may do this to reserve bandwidth for its own use. But the ILEC should only bump traffic onto the secondary route when there is an extenuating circumstance.

"Network faults" is a general term used to describe communication problems at certain points of the network. These faults must be isolated. Translation problems and network faults comprise only a portion of the many ailments that can plague the proper establishment of a signal transmission from an EO to some target component. Accordingly, the primary route must be tested.

In order to test a customer's primary route properly, a signal transmission must originate at the customer's EO, that is the EO that receives calls made by the customer. Initiating calls that originate at the proper EO is difficult when a testing facility and staff are located in a geographic area different from that of the EO to be tested. Such testing can be so difficult that it is often abbreviated if conducted at all. An Internet Service Provider (ISP) must rely on customer complaints to diagnose and fix errors. An alternative to carrying out the required testing includes sending technicians to the field armed with quarters to initiate calls from respective pay phones that route to the EO to be tested. Both practices are inefficient and impractical.

Finally, although systems commonly known as "war dialers" exist, these systems fail to test the primary route discussed above. When calling a reported number long-distance, the call is routed through access tandem switches and bypasses the EO that is receiving the customer's call. Such a test method does not recreate a customer's experience and leads to a false-positive when no problem is found. Conditions through access tandem switches are not indicative of the customer's experience.

Accordingly, there exists a need for a method and system of remotely testing network components and diagnosing problems in establishing a communications link between an EO and a target component in a telecommunications network environment.

SUMMARY OF THE INVENTION

The present invention solves at least the above problems by providing a system and method for remotely testing and diagnosing problems associated with establishing a communications link between an EO and a target component. The test system is capable of remotely originating a call at a distant EO and of monitoring the signaling associated with attempting to complete the call.

The present invention has several practical applications in the technical arts, including enabling the testing and diagnosing of customer call problems remotely at any EO in which LEC service is provided. Calls can be originated directly at an EO in question. The present testing system and method provides remote verification that calls from any specific LEC EO were properly translated and routed. Calls that simulate the customer's experience can be generated.

The present invention provides timely resolution of issues and enhances regression testing during new software implementations. A call generator/tester is provided to increase automation and reliability and to resolve call-connection problems quickly. The present invention is a system that enables easier testing of code and inclusion of network data for confirmation of code upgrades and improvements.

In some embodiments, the system and method provides a process for remotely diagnosing problems in establishing a communications link between a call-routing component and a target component in a telecommunications network environment. From a remote site, a signal transmission is originated at the call-routing component, such as an EO, that is bound for the target component, such as a remote access server or modem bank. The communication signaling of the associated signal transmission is monitored to diagnose and solve problems with establishing the link.

Originating the signal transmission can be accomplished by providing a phone number that is configured to be remote call-forwarded to the target component. This first phone number is directed to the EO and will route to the same EO that receives the customer's outgoing calls. The customer's experience is accurately recreated from a remote location. The call to the EO is initiated from a remote location and remote call-forwarded to the target component. The remote-call-forwarded call is originated at the customer's EO or switch and its signaling is monitored by a call generator/tester, which initiated the first call. The call generator/tester provides data that can be observed to diagnose problems with establishing the communications link.

In another embodiment, a method is disclosed for testing an actual enduser's modem line, commonly known as "the last mile." A first path is tested and found to be error-free. Then a second path, which includes the customer's last mile, is tested. If any problems are found on the second path, the problems are associated with the last mile.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for remotely diagnosing problems in establishing a connection between a local phone company and a target component in a telecommunications network environment.

Acronyms and Shorthand Notations

Throughout the disclosure of the instant invention, several acronyms and shorthand notations are used to aid in the understanding of certain concepts pertaining to the associated system and services. These acronyms and shorthand notations are intended solely for the purpose of providing an easy methodology of communicating the ideas expressed herein, and are in no way meant to limit the scope of the present invention. The following is a list of these acronyms:

| | |
|---|---|
| CLEC | Competitive Local Exchange Carrier |
| CO | Central Office |
| EO | End Office |
| ISP | Internet Service Provider |
| ISUP | Integrated Services Digital Network User Part |
| ILEC | Incumbent Local Exchange Carrier |
| LEC | Local Exchange Carrier |
| PC | Personal Computer |
| POTS | Plain Old Telephone Service |
| PSTN | Public Switched Telephone Network |
| RCF | Remote Call Forwarding |
| SS7 | Signaling System 7 |

Further, various telecom technical terms are used throughout this disclosure. A definition of such terms can be found in: H. Newton, Newton's Telecom Dictionary, 18$^{th}$ Updated and Expanded Edition (2002). These definitions are intended for providing a clearer understanding of the ideas disclosed herein and are in no way intended to limit the scope of the present invention. The definitions and terms should be interpreted broadly and liberally to the extent allowed by the art and the meaning of the words offered in the above cited reference.

Figure 1:
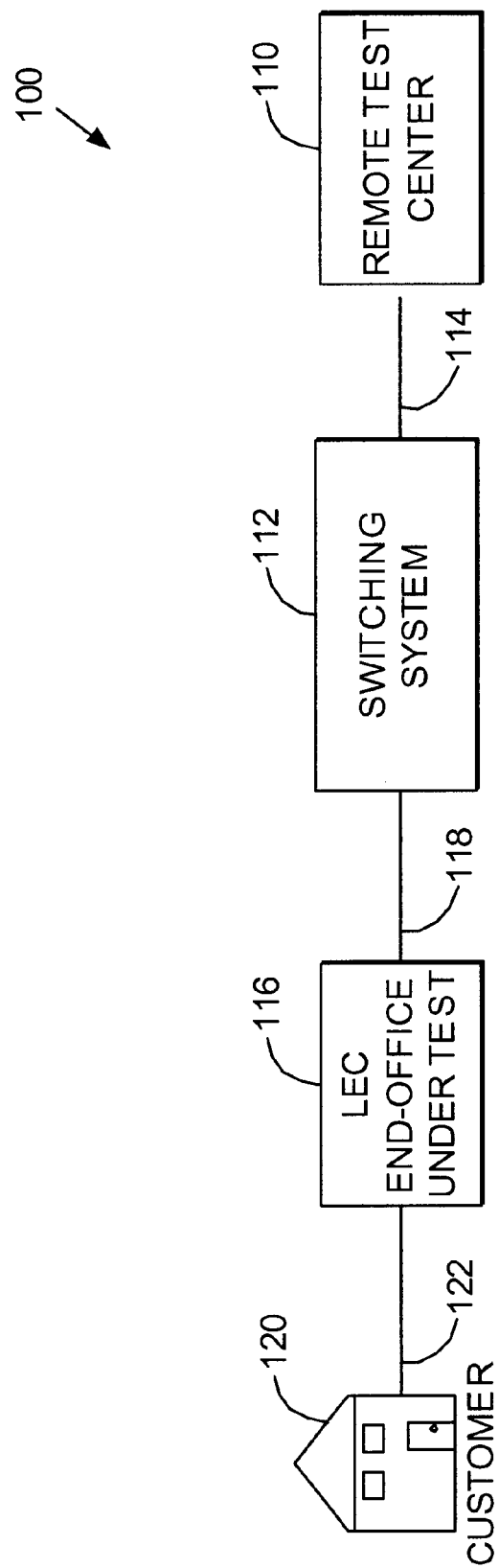
FIG. 1 is a block diagram of the test system in an embodiment of the invention.

Turning now to FIG. 1, an exemplary operating environment for practicing the present invention is depicted and referenced generally by the numeral 100. A remote test center 110 is coupled to a switching system 112 by a first signaling link 114. Switching system 112 includes at least an assembly of equipment arranged for establishing connections between lines, lines to trunks, or trunks to trunks. Remote test center 110 is used to test the establishment of calls originating at a call-routing component. One type of call-routing component is an EO 116. EO 116 is connected to switching system 112 via a primary ISUP trunk 118. Many systems or devices could be a call-routing component, including a single switch. An EO is typically a central office to which a telephone subscriber is connected. A central office can be a single telephone switch or a telephone company building where subscribers' lines are joined to switching equipment for making call connections. Accordingly, a call-routing component can include, but is not limited to, an EO, a central office, a single telephone switch, or an assembly of equipment used to connect customers. Finally the EO under test 116 is connected to customer 120 via second signaling link 122.

Figure 1A:
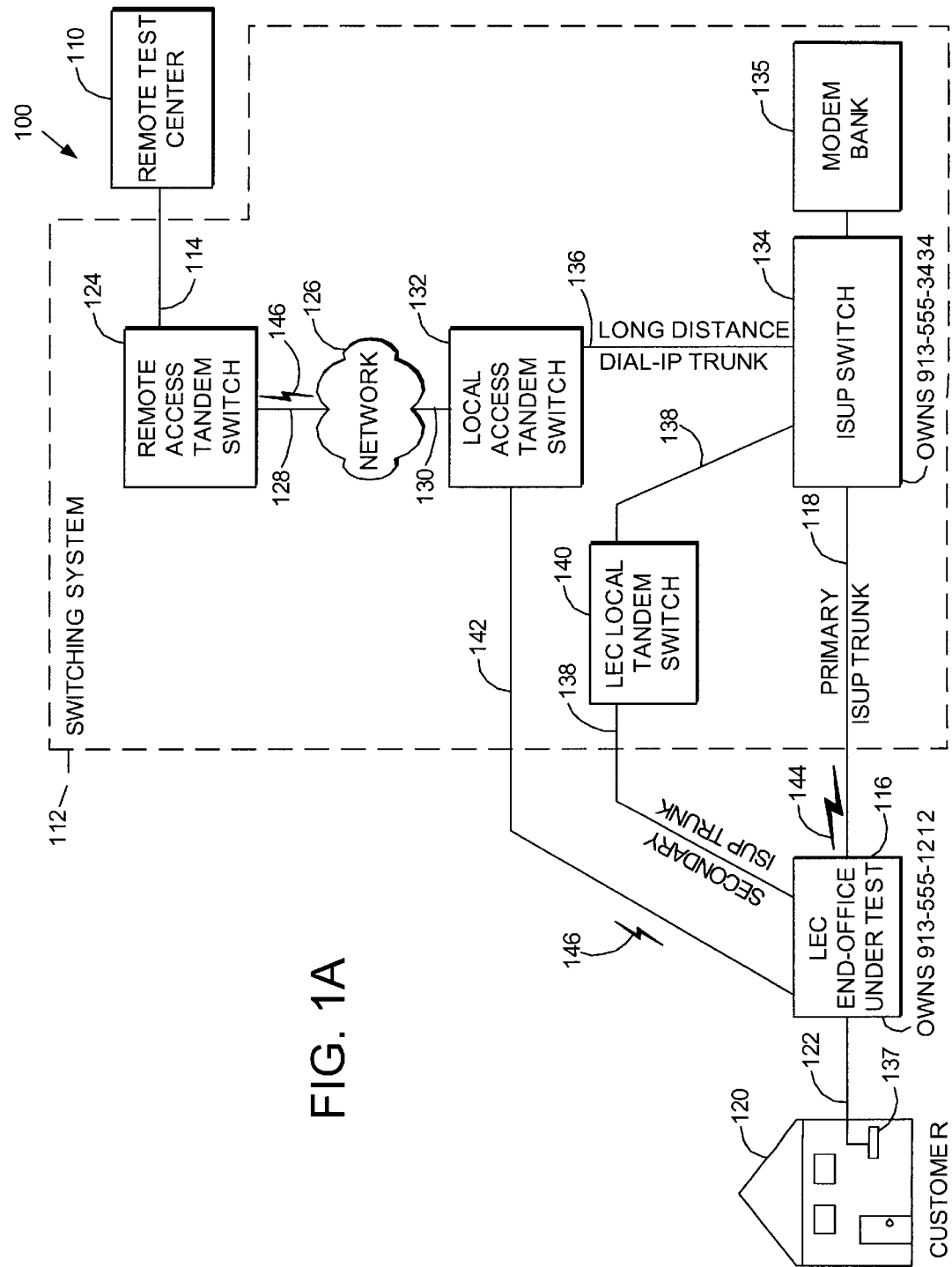
FIG. 1A is a block diagram of the call system depicting the switching system in greater detail.

Turning now to FIG. 1A, a more detailed view of the switching system 112 is provided. Switching system 112 can include a variety of components including components not shown. The illustration of switching system 112 in FIG. 1A is provided for illustrative purposes and is not intended to limit the scope of switching systems. In one embodiment, switching system 112 includes a remote access tandem switch 124 connected to a telecommunications network 126 by a third signaling link 128. A fourth signaling link 130 connects communications network 126 to a local access tandem switch 132. Conventional in nature, access tandem switches provide an interexchange carrier with access to multiple end offices and typically facilitate long-distance connections. Tandem switches 124 and 132 are included for illustrative purposes.

In one embodiment, the local access tandem switch 132 is connected directly to an ISUP switch 134 via a long-distance ISUP trunk 136. ISUP determines the procedures for setting up, coordinating, and taking down trunk calls on the SS7 network. ISUP switch 134 helps negotiate communication between a target component, such as a modem bank 135 and an end-user device such as a customer's modem 137. A long-distance ISUP trunk 136 allows a long-distance call to be connected directly to ISUP switch 134 without having to pass through the EO 116. A local exchange carrier is typically a local phone company.

The EO 116 to be tested is connected to the ISUP switch 134 via the primary ISUP trunk 118. When a customer 120 attempts to establish an Internet connection, the signal will flow through second signaling link 122 to the EO 116 and through primary ISUP trunk 118 to ISUP switch 134 and finally to modem bank 135. If, however, all the circuits on the primary ISUP trunk 118 are busy, or primary ISUP trunk 118 is unavailable, then a customer's call will be completed via a secondary. ISUP trunk 138, which connects to a local tandem switch 140. Tandem switches are generally arranged whereby the trunk from the calling office is connected to a trunk at the called office through an intermediate point. The local tandem switch 140 reduces the number of busy signals received by customer 120 in attempting to connect to one of the modems in modem bank 135. Typically, calls cannot be overflowed into an access tandem switch such as local access tandem switch 132. Local tandem switch 140 serves as a component to service calls overflowed from primary ISUP trunk 118. Long-distance calls are routed over a fifth signaling link 142 to local access tandem switch 132.

Exemplary operating environment 100 of FIG. 1A illustrates an environment where a customer 120 accesses the Internet via dial-up service. Different business entities are often involved in connecting customer 120 to the Internet. For example, three entities that may be involved include: 1) an Internet Service Provider (ISP) such as AOL; 2) a LEC such as Southwestern Bell; and 3) an ISUP switch owner such as the Sprint Communications Company of Overland Park, Kans.

In exemplary operating environment 100, customer 120 is located in a different geographic region than the remote test center 110. For example, remote test center 110 could be located in Reston, Va. while customer 120 is in Kansas City, Mo. The present invention provides a method and system for a technician in the remote test center 110 to remotely originate and monitor a signal transmission 144 at the EO 116 under test, thereby reproducing the call experience of customer 120. The signal transmission 144 is originated in response to the call 146 from the remote test center 110.

A signal transmission 144 originating from the EO 116 can be monitored by the remote test center 110. Historically, testing calls at a remote test center 110 has been difficult because calls could not be efficiently originated at the EO 116 under test. For example, if a call to the modem bank 135 were initiated from remote test center 110, the call would be completed by traveling from the remote access tandem switch 124, through network 126, through local access tandem switch 132, and directly to ISUP switch 134. With long-distance ISUP trunk 136, the call originating from the remote test center would never reach the EO under test 116. Without passing through EO 116, a call cannot be properly tested because it does not travel the route of customer 120's call.

Figure 1B:
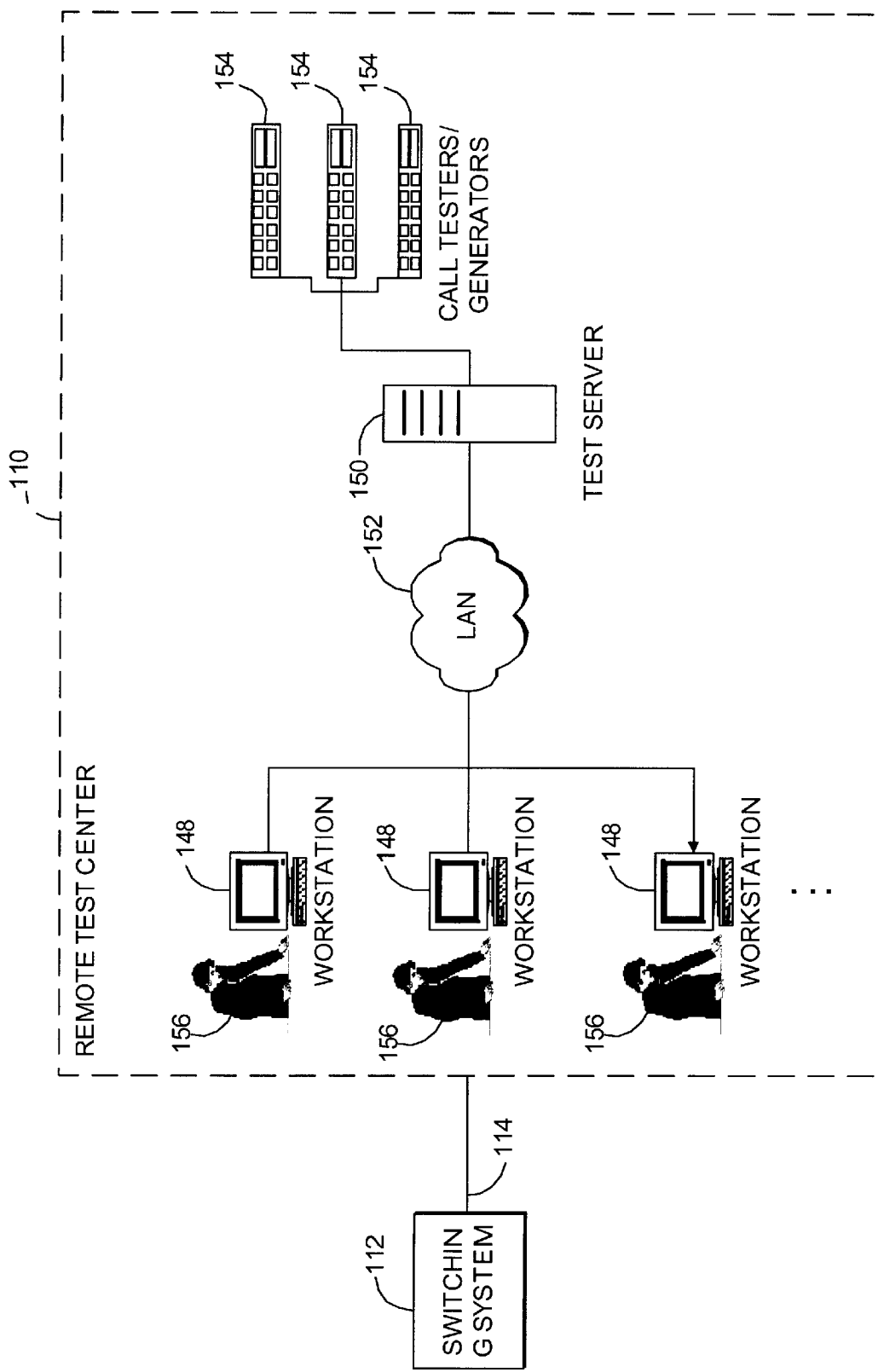
FIG. 1B is a more detailed block diagram of the remote test center.

Turning now to FIG. 1B, a more descriptive illustration of remote test center 110 is provided. Several workstations 148 are logically coupled to a local test server 150 via a network such as a local area network 152. The test server 150 can generate tests and process the signaling data associated with calls 144 and 146. A serie's of call testers/generators 154 are connected to the local test server 150. An exemplary call generator suitable for use in the present invention is the TSI-1575 Modem/Network Test Unit ("TELESYNC unit") produced by the Telesync Corporation of Norcross, Georgia.

Although referred to herein as simply a "call generator," call generator 154 is capable of issuing the described tests and retrieving the data necessary to diagnose a variety of communications problems across various network paths. Exemplary data that can be retrieved via call generator 154 includes telephone attenuation distortion characteristics (attenuation versus frequency), elapsed time, modulation, speed, roundtrip delay, receive level, transmit level, signal-to-noise ratio, and data error statistics. A technician 156 can select tests to run.

The test server 150 provides test options to technician 156 through a graphical user interface (GUI). In some embodiments of the invention, the test server 150 is a conventional web server. The test server 150 generates and releases calls through the switching system 112. The test server 150 also directs the call generators 154 to run tests selected by the user. The call generators 154 can also be configured to run tests automatically. The GUI is preferably an Internet-based user interface that allows technicians 156 to remotely initiate communications tests.

In any telephone system, some form of signaling mechanism is required to set up and tear down calls. When a call is originated, many forms of different signaling are used to establish a terminal connection. Signaling exists between a company's phone system and its local telephone company system. There is signaling between central offices. Exemplary forms of signaling include the ringing of a telephone, a dial tone, protocol negotiations, call-routing information, call-path designation, switching information, and generally all other communications necessary to begin, establish, and terminate a call. In some embodiments of the invention, the signaling is Signaling System #7 (SS7). Those skilled in the art will recognize other forms of signaling that could be used in the context of the invention, such as C7, Integrated Services Digital Network (ISDN), Asynchronous Transfer Mode (ATM), or TR-303. Signaling can be observed to isolate network communications problems and determine how and to where calls are routed.

When a phone number is owned by an EO, calls made to that phone number will be routed to that EO. By way of illustration, assume EO 116 owns phone number 913555-1212 ("the 1212 number"). All calls made to the 1212 number will be routed to EO 116. In other circumstances, an ISUP switch may own a phone number that is configured to go directly to that switch. By way of further illustration, assume ISUP switch 134 owns phone number 913-555-3434 ("the 3434 number"). Customer 120 would call the 3434 number to connect to the Internet.

With additional reference to FIG. 1A, if the 3434 number was dialed directly from the remote test center 110, it would pass through remote access tandem 124, network 126, through local access tandem 132, and directly to ISUP switch 134 via dial-up trunk 136. Such a long-distance call to the 3434 number from remote test center 110 does not follow the same path as a customer's call. Because the 3434 number would be dialed long-distance from the remote test center 110, it would pass through both access tandems 124 and 132 instead of through EO 116. If a test were conducted by dialing the 3434 number long-distance, a false-positive could be returned that the customer's connection is functioning properly. The long-distance path through the access tandems 124 and 132 would be tested, but not the path from the customer's EO 116 to the modem bank 135. Directly dialing the 3434 long-distance number would not permit accurate diagnosing of problems encountered by customer 120.

The present invention takes advantage of the remote call forwarding (RCF) service to monitor a signal transmission 144 remotely originated at EO 116. RCF allows calls to be forwarded to a chosen destination. RCF is similar to call-forwarding on a residential line but is not constrained by the need to have a real phone or some other form of physical presence. RCF can exist purely in a central office or EO. Using RCF, an initial phone call 146 can originate a new signal transmission 144.

Figure 2:
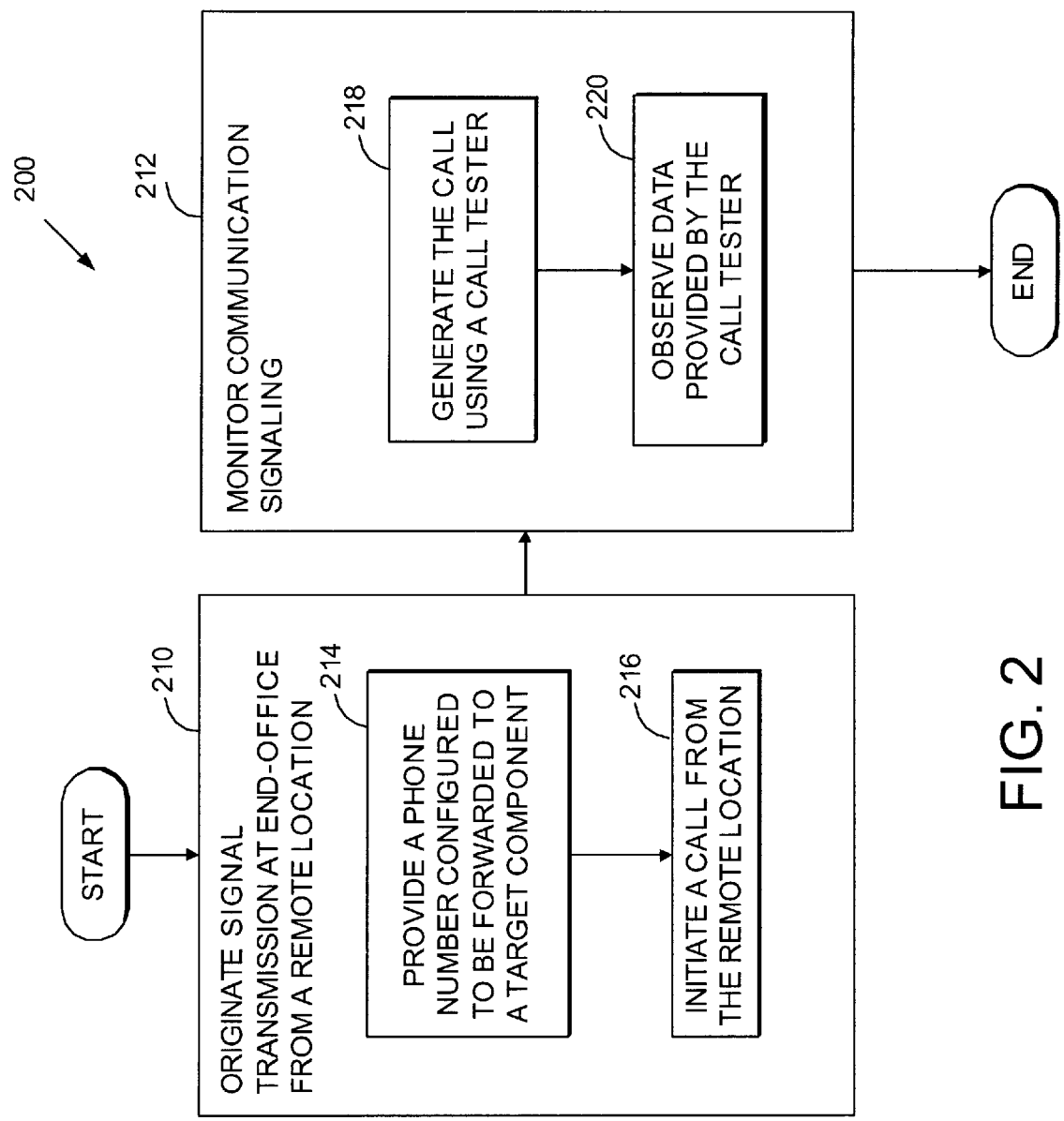
FIG. 2 is a process diagram illustrating an exemplary method for practicing the present invention.

Turning now to FIG. 2, an exemplary process for remotely diagnosing problems in establishing a communications link between EO 116 and a modem bank 135 is referenced generally by the numeral 200. At a first step 210, a signal transmission 144 is originated at EO 116 from a remote location 110. At a final step, any problems associated with establishing a communications link are diagnosed by monitoring the signaling associated with signal transmission 144 at a step 212.

Step 210 of remotely originating signal transmission 144 can include two steps. At a step 214, a phone number is provided that is owned by EO 116. The phone number provided will route to EO 116 and is configured to be forwarded to a number that is directed to the ISUP switch 134. At a next step 216, a call 146 is initiated from a remote location 110 that will be forwarded to some target component. For example, the 1212 number is dialed from remote test center 110. The 1212 number routes to EO 116. From EO 116, the 1212 number originates a new transmission, signal transmission 144, via RCF. In this example, the new signal transmission 144 is a call to the 3434 number.

The step 212 of monitoring the communication signaling of signal transmission 144 could also include two steps. First, the call 146 is generated using a call generator 154 at a step 218. Finally, the data provided by the call generator 154 is observed at a step 220. The call generator 154 sustains a connection between itself and a modem in modem bank 135. With this connection established, a plurality of tests can be conducted by the call generator 154 including but not limited to a signal translation test, a call-routing test, a telephone attenuation/distortion test, and a data-error test.

A signal translation test can be used to diagnose problems with changes made by the network to destination points that allow the call to progress through the network. A call-routing test can be used to pinpoint sources of error in routing a call to its intended destination. A telephone attenuation/distortion test can be used to determine the extent of signal degradation or noise that may impede the establishment of a desired communications link. Data-error tests can be conducted to determine whether errors exist over certain lines, junction points, or through components that prevent a call from connecting or staying connected with a desired quality level.

Figure 3A:
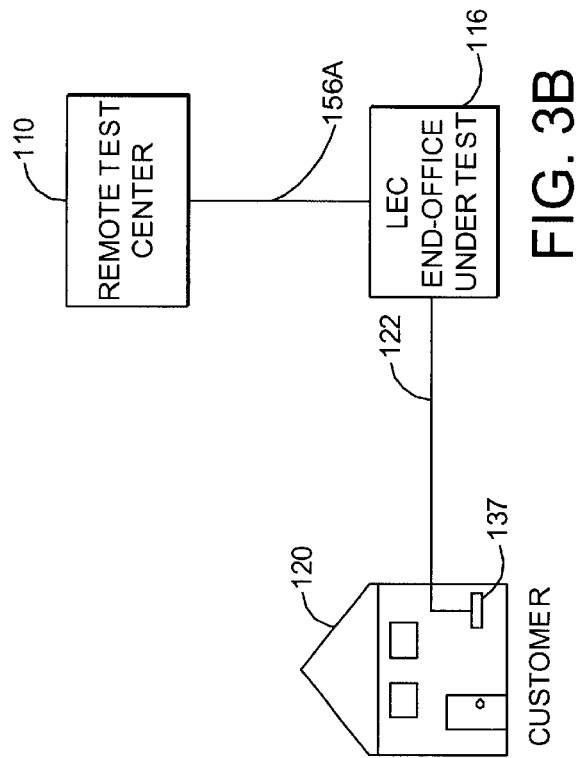
FIG. 3A is a block diagram of an alternative embodiment of the present invention.

In another embodiment of the present invention the "last mile," the connection from a customer 120 to EO 116, can be tested. A block diagram of a system for testing a last mile is provided in FIG. 3A. Turning now to FIG. 3A, a first path is provided from remote test center 110, which can be in one city, through EO 116 to a target component such as a modem in modem bank 135. This first path is comprised of a first segment 156A leading to the EO 116 and a second segment 156B leading to the modem bank 135. In this example, end-user device 137 accesses the Internet by connecting to a modem in modem bank 135. A second path from the remote test center 110 includes first segment 156A and third segment 122 leading from EO 116 to customer 120. First, second, and third segments 156A, 156B, and 122 are not necessarily single connections. Each segment is generally a portion of a network, such as the PSTN, and represents the series of logical connections necessary to couple the various components of FIG. 3A to each other.

Figure 3B:
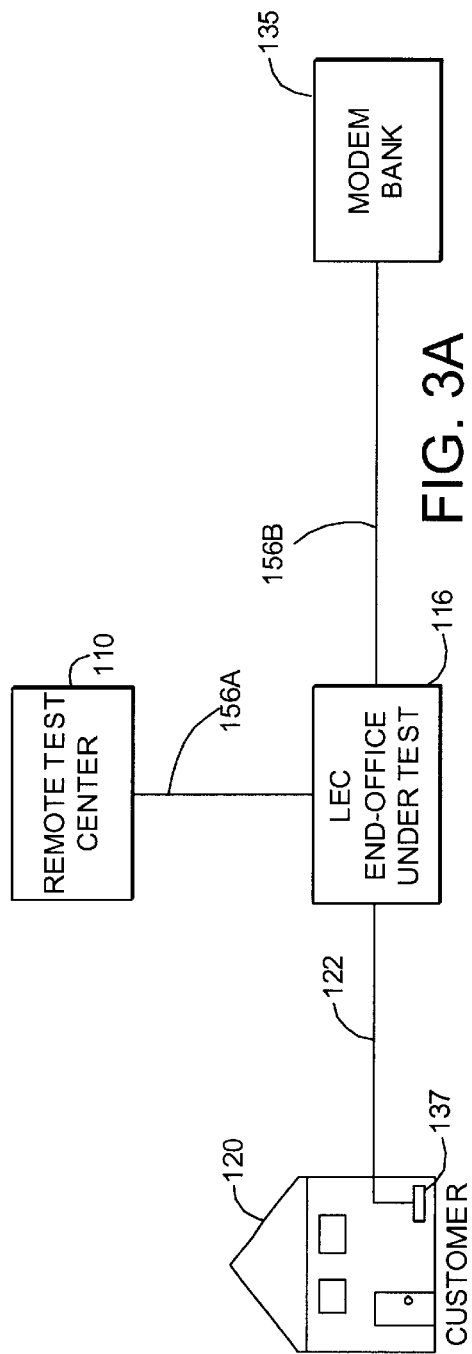
FIG. 3B is a block diagram of another alternative embodiment of the present invention.

Modem bank 135 is not necessary to test segment 156A. As illustrated in FIG. 3B, segment 156B need not be present. However, testing the path from the remote test center 110 to the modem bank 135 (FIG. 3A) tests segment 156A. As described below, a process used to test a path to a modem bank 135 also tests segment 156B.

Figure 4:
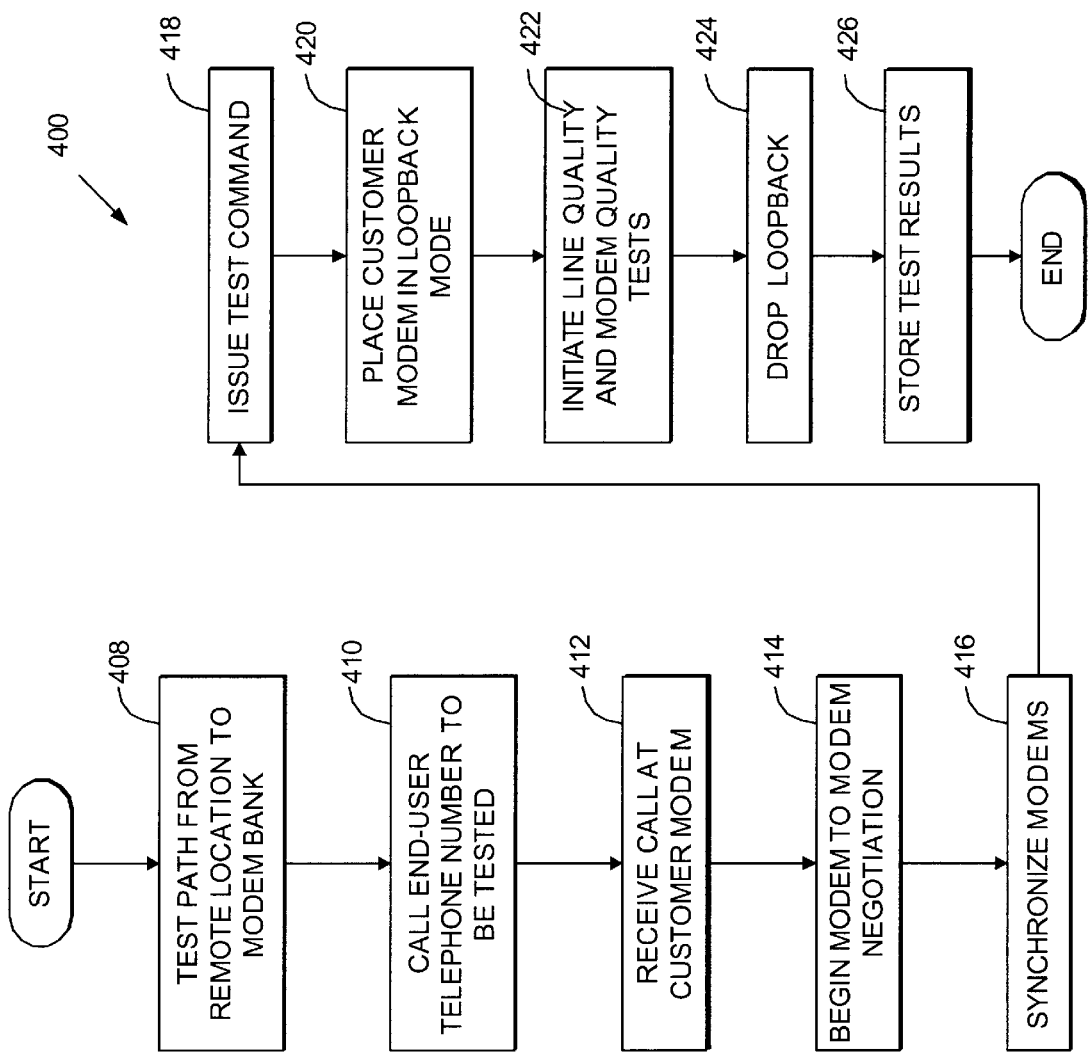
FIG. 4 is a process diagram illustrating an exemplary method for practicing an alternative embodiment of the present invention.

Turning now to FIG. 4, an exemplary process for testing an end-user device 137, and consequently the last mile 122, is referenced generally by the numeral 400. An exemplary end-user device is a customer's modem 137. Exemplary process 400 is a detailed example provided to illustrate how the present invention can be used to test the last mile 122 and end-user device 137. Exemplary process 400 is not meant to limit or restrict the present invention in any way. One skilled in the art will also appreciate that the order illustrated in FIG. 4 is not mandatory and that some steps can be interchanged with other steps.

Beginning at a step 408, the path from the remote test center 110 to the modem bank 135 is tested. This step 408 is carried out as described above and as illustrated in FIG. 2. Performing this test permits a determination to be made that no communications problems exist along first segment 156A and second segment 156B. Regarding segment 156A, a basic troubleshooting step is to analyze the results from the call generator 154 and to interpret the results. If all tests show errors, then a problem most likely exists on the first segment 156A. These problems are eliminated before the process continues.

Next, a call is placed to the specific end-user telephone number to be tested. In this example, the end-user is customer 120. Call generator 154 is used to call the customer 120 phone number at a step 410. At a step 412, the call routes across first segment 156A through EO 116, across second segment 122 to customer modem 137. At a step 414, call generator 154 receives an answer from its call to customer modem 137 and begins modem to modem negotiation. The call generator 154 negotiates a compatible protocol with customer modem 137 whereby the modems synchronize at a step 416.

After the modems synchronize, the call generator 154 issues a test command, such as a loop code command at a step 418. The customer modem will respond by placing itself in a loopback mode at a step 420. The call generator 154 will initiate a predetermined series of line quality and modem quality tests at a step 422. The tests preferably last for no longer than 3 minutes. At the completion of the tests, the loopback will be dropped via a "loop down" command at a step 424. Finally, the test results will be stored inside the call generator 154 or test server 150 at a step 426. The test results can then be displayed, forwarded to a collection server, archived, or otherwise manipulated as desired.

Any problems that are observed can be attributed to problems along the last mile 122 because all other segments were tested and determined to be error-free at step 408.

As can be seen, the present invention and any equivalents is well adapted to provide end-user dial testing from a remote location. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art to that the present invention pertains without departing from its scope.

It will be understood that certain features and subcombinations are of utility and may be employed without reference to other features and subcombinations and are contemplated within the scope of the claims. Not all steps listed in the various figures need be carried out in the specific order described.

What the invention claimed is:

1. A method for remotely diagnosing problems in establishing a communications link between a call-routing component and a target component in a telecommunications network environment, comprising:
   from a remote site, originating a signal transmission at said call-routing component bound for said target component, said originating including:
      providing a first phone number specific to said call-routing component and configured to be forwarded at said call-routing component to a second phone number directed toward said target component; and
      initiating a call from said remote site to said first phone number, whereby said call is forwarded to said second phone number, thereby originating said signal transmission; and
   monitoring communication signaling of said signal transmission, whereby problems with establishing said communications link can be identified.

2. The method of claim 1, wherein said call-routing component is an end office.

3. The method of claim 1, wherein monitoring communication signaling of said signal transmission includes:
   generating said call from said remote site with a call tester; and
   observing data provided by said call tester gathered from said signaling.

4. The method of claim 1, wherein diagnosing problems in establishing said communications link includes conducting a test on establishing said communications link.

5. The method of claim 4, wherein said test is a signal translation test.

6. The method of claim 4, wherein said test is a call-routing test.

7. The method of claim 4, wherein said test is a telephone attenuation/distortion test.

8. The method of claim 4, wherein said test is a data error test.

9. A computer-readable medium having computer-useable instructions embodied thereon for testing a communications link between a signal-routing component and a target component in a telecommunications network environment, said computer-useable instructions, comprising:
   code for remotely originating a signal transmission at said signal-routing component, said code for remotely originating said signal transmission including:
      code for calling a first phone number specific to said signal-routing component and configured to be forwarded at said signal-routing component to a second phone number directed toward said target component; and
      code for forwarding a call made to said first phone number to said second phone number, thereby originating said signal transmission; and
   code for remotely receiving signaling information associated with said signal transmission.

10. The computer-readable medium of claim 9, wherein said signal-routing component is an end office.

11. The computer-readable medium of claim 10, wherein said signal-routing component is a switch.

12. The computer-readable medium of claim 9, wherein said code for remotely receiving signaling information includes:
   code for receiving calling instructions from a call tester;
   code for generating said call based on said calling instructions; and
   code for observing data provided by said call tester.

13. The computer-readable medium of claim 9, wherein said computer-usable instructions for testing said communications link further includes code for conducting a test on establishing said communications link.

14. The computer-readable medium of claim 13, wherein said test is a signal translation test.

15. The computer-readable medium of claim 13, wherein said test is a call-routing test.

16. The computer-readable medium of claim 13, wherein said test is a telephone attenuation attenuation/distortion test.

17. The computer-readable medium of claim 13, wherein said test is a data error test.

18. A system for diagnosing problems associated with establishing a communications link between a first network component and a second network component in a telecommunications network environment, comprising:
   a remote call-generation component;
   a test server component logically coupled to said call-generation component for managing calls to at least a first phone number specific to said first network component; and
   a call-forwarding component for forwarding said calls from said first phone number at said call-generation component to at least a second phone number directed toward said second network component,
   whereby problems associated with attempting to establish said communications link can be remotely observed.

19. A method for testing a communications link, between a signal-routing component and a target component in a telecommunications network environment, comprising:
   remotely originating a signal transmission at said signal-routing component, said remotely originating including:
      providing a first phone number specific to said signal-routing component and configured to be forwarded at said call-routing component to a second phone number directed toward said target component; and
      initiating a call from a remote site to said first phone number, whereby said call is forwarded to said second phone number, thereby originating said signal transmission; and
   remotely receiving signaling information associated with said signal transmission, whereby said signaling information is used to determine problems associated with maintaining said communications link.

20. In a telecommunications network environment wherein a first signal path is comprised of a first segment from a remote test device to a call-routing component and a second segment from the call-routing component to a target component and a second signal path is comprised of the first segment and a third segment from the call-routing component to an end-user device, a method for remotely testing said third segment, comprising:
   determining that no communications problems exist along said first signal path, wherein said determining includes, from said remote test device, originating a signal transmission at said call-routing component bound for said target component by providing a first phone number specific to said call-routing component and configured to be forwarded at said call-routing component to a second phone number directed toward said target component and initiating a call from said remote test device to said first phone number, whereby said call is forwarded to said second phone number thereby originating said signal transmission; and initiating an end-user test across said second signal path, whereby any communications problems observed will correspond to problems across the third segment.

21. The method of claim 20, wherein said call-routing component is a switch.

22. The method of claim 20, wherein determining that no communications problems exist along said first signal path further includes:

issuing a test command from said remote test device; and receiving data based on said test command, whereby said first signal path can be determined to be error-free.

23. The method of claim 20, wherein initiating an end-user test across said second signal path includes:

establishing a connection with said end-user device;

issuing a test command via said remote test device; and receiving data from said test command to isolate a communications problem along said second signal path.

24. The method of claim 23, wherein said test command includes a loop code command.

25. The method of claim 23, wherein said test command includes a data error command.

26. A computer programmed to perform the steps recited in the method of claim 20.

27. In a telecommunications network environment wherein a first signal path is comprised of a first segment from a remote test device to a call-routing component and a second segment from the call-routing component to a target component and a second signal path is comprised of the first segment and a third segment from the call-routing component to an end-user device, a computer-readable medium having computer-useable instructions embodied thereon for remotely testing said third segment, comprising:

code for determining that no communications problems exist along said first signal path, said code including, from said remote test device, code for originating a signal transmission at said call-routing component bound for said target component, said code including code for providing a first phone number specific to said call-routing component and configured to be forwarded at said call-routing component to a second phone number directed toward said target component and code for initiating a call from said remote test device to said first phone number, whereby said call is forwarded to said second phone number, thereby originating said signal transmission; and code for initiating an end-user test across said second signal path, whereby any communications problems observed will correspond to problems across said third segment.

28. The computer-readable medium of claim 27, wherein said call-routing component is a switch.

29. The computer-readable medium of claim 27, wherein said code for determining that no communications problems exist along said first signal path further includes:

code for issuing a test command from said remote test device; and code for receiving data based on said test command, whereby said first signal path can be determined to be error-free.

30. The computer-readable medium of claim 27, wherein code for initiating an end-user test across said second signal path includes:

code for establishing a connection with said end-user device;

code for issuing a test command via said remote test device; and code for receiving data from said test command to isolate a communications problem along said second signal path.

31. The computer-readable medium of claim 30, wherein said test command includes a loop code command.

32. The computer-readable medium of claim 30, wherein said test command includes a data error command.

33. In a telecommunications network environment wherein a signal path from a remote test device to an end-user's device is comprised of a first segment from a remote location to a call-routing component and a second segment from the call-routing component to the end-user's device, and a third segment from the call-routing component to a target component, a method for remotely testing said second segment, comprising:

providing for the determination that no communications problems exist along said first and third segments, said providing including:

from said remote test device, originating a first signal transmission at said call-routing component bound for said target component said originating including providing a first phone number specific to said call-routing component and configured to be forwarded at said call-routing component to a second phone number directed to said target component and initiating a call from said remote location to said first phone number, whereby said call is forwarded to said second phone number, thereby originating said signal transmission; and monitoring communication signaling of said first signal transmission, whereby problems with said first and third segments can be eliminated; and providing for the testing of said first and second segments, whereby any communications problems observed on said testing correspond to problems across said second segment.

34. The method of claim 33, wherein monitoring communication signaling of said first signal transmission includes:

generating said call from said remote location with a call tester; and observing data provided by said call tester gathered from said signaling.

35. The method of claim 33, wherein providing for the testing of said second and third paths segments includes:

from said remote test device, originating a second signal transmission at said call-routing component bound for said end-user's device; and monitoring communication signaling of said second signal transmission.

36. The method of claim 35, wherein originating said second signal transmission includes:

providing said first phone number specific to said call-routing component and configured to be forwarded at said call-routing component to a third phone number directed to said end-user's device; and initiating a call from said remote location to said first phone number, whereby said call is forwarded to said third phone number, thereby originating said second signal transmission.

37. The method of claim 36, wherein monitoring communication signaling of said second signal transmission includes:

generating said call from said remote location with a call tester; and observing data provided by said call tester gathered from said signaling.

38. In a telecommunications network environment wherein a signal path from a remote test device to an end-user's device is comprised of a first segment from the remote test device to a call-routing component and a second segment from the call-routing component to the end-user's device, a method for remotely testing said second segment, comprising:

providing for the determination that no communications problems exist along said first segment, said providing including:

from said remote test device, originating a first signal transmission at said call-routing component bound for said target component, said originating including providing a first phone number specific to said call-routing component and configured to be forwarded at said call-routing component to a second phone number directed to said target component and initiating a call from said remote location to said first phone number, whereby said call is forwarded to said second phone number, thereby originating said signal transmission; and monitoring communication signaling of said first signal transmission, whereby problems with said first and third segments can be eliminated; and providing for the testing of said signal path, whereby any communications problems observed on said signal path correspond to problems across said second segment.

\* \* \* \* \*